(12) United States Patent
Onogi et al.

(10) Patent No.: US 7,701,525 B2
(45) Date of Patent: Apr. 20, 2010

(54) LIQUID CRYSTAL PANEL HAVING FIRST AND SECOND TRANSISTORS ON THE SAME SIDE WITH RESPECT TO A DRAIN LINE

(75) Inventors: Tomohide Onogi, Gifu (JP); Yasuo Segawa, Gifu-ken (JP)

(73) Assignee: Epson Imaging Devices Corporation, Azumino-Shi, Nagano (JP)

( * ) Notice: Subject to any disclaimer, the term of this patent is extended or adjusted under 35 U.S.C. 154(b) by 224 days.

(21) Appl. No.: 11/820,626

(22) Filed: Jun. 20, 2007

(65) Prior Publication Data

US 2008/0123003 A1 May 29, 2008

(30) Foreign Application Priority Data

Jun. 21, 2006 (JP) ............... 2006-170891

(51) Int. Cl.
*G02F 1/1343* (2006.01)
*G02F 1/1368* (2006.01)

(52) U.S. Cl. .................. 349/48; 349/43; 349/146; 257/59

(58) Field of Classification Search ............ 349/48, 349/41–43
See application file for complete search history.

(56) References Cited

U.S. PATENT DOCUMENTS 4,907,861 A * 3/1990 Muto ................ 349/55

7,015,994 B2 * 3/2006 Cho et al. ............ 349/109
7,145,623 B2 12/2006 Sasaki

FOREIGN PATENT DOCUMENTS

| JP | 61-281202 | | 12/1986 |
|----|-----------|---|---------|
| JP | 2003-084718 | A | 3/2003 |
| JP | 2003-228301 | A | 8/2003 |
| JP | 2005-258094 | | 9/2005 |
| JP | 2006-053402 | | 2/2006 |
| JP | 2006-139058 | A | 6/2006 |
| JP | 2006139058 | A * | 6/2006 |

OTHER PUBLICATIONS

Kugimiya Hideyuki, Machine translation of JP 2006-139058 A, Jun. 2006.*

* cited by examiner

*Primary Examiner*—Andrew Schechter
*Assistant Examiner*—Paul C Lee
(74) *Attorney, Agent, or Firm*—McCarter & English, LLP

(57) ABSTRACT

A liquid crystal panel includes a line extending between a first pixel and a second pixel which are adjacent to each other; a first pixel element portion for the first pixel; and a second pixel element portion for the second pixel. The first pixel element portion is provided on a side with respect to the line where the first pixel is disposed. The second pixel element portion is provided, along with the first pixel element portion, on the side with respect to the line where the first pixel is disposed.

6 Claims, 19 Drawing Sheets

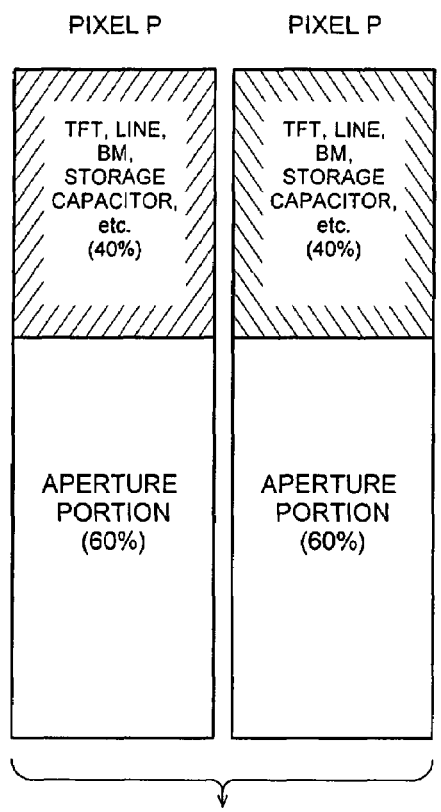
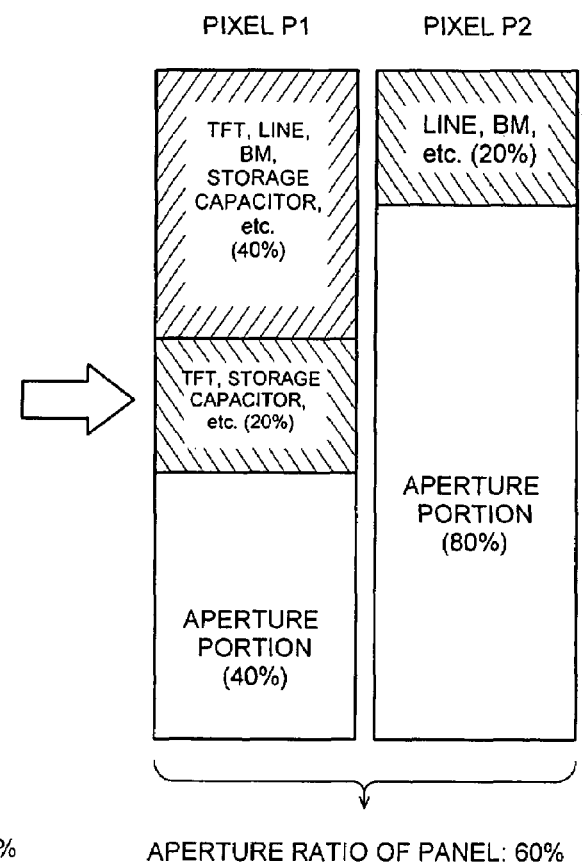
Fig. 1A
Fig. 1B

LIQUID CRYSTAL PANEL HAVING FIRST AND SECOND TRANSISTORS ON THE SAME SIDE WITH RESPECT TO A DRAIN LINE

PRIORITY INFORMATION

This application claims priority of Japanese Patent Application No. 2006-170891 filed on Jun. 21, 2006, which is incorporated herein in its entirety.

BACKGROUND

1. Technical Field

The present invention relates to a liquid crystal panel, and more particularly to a liquid crystal panel that is applicable when adjusting an aperture area of a pixel for the purpose of chromaticity adjustment, for example.

2. Related Art

Referring to FIGS. 11 to 13, plan views showing a structure (layout) of a display region corresponding to four pixels of a TN (Twisted Nematic) mode liquid crystal panel 130T of related art are shown. Here, for the purpose of clarity, FIG. 11 shows a structure where a pixel electrode 152 shown in FIG. 12 is removed, and FIG. 12 shows a structure where a black matrix (BM) 162 shown in FIG. 13 is removed.

In the liquid crystal panel 130T, a pixel P corresponds to an aperture portion of the black matrix 162 and is defined by a shape of the aperture portion. The pixel P is provided between adjacent drain lines 146. Each pixel P of the liquid crystal panel 130T has an identical size. In each region 146B formed between adjacent drain lines 146, a pixel TFT (Thin Film Transistor) 170, a storage capacitor 172, and a pixel electrode 152 for the pixel P are provided.

Referring to FIGS. 15 to 17, plan views showing a structure (layout) of a display region corresponding to four pixels of an FFS (Fringe Field Switching) mode liquid crystal panel 130F of related art are shown. Here, for the purpose of clarity, FIG. 14 shows a structure where a pixel electrode 152 shown in FIG. 15 is removed, FIG. 15 shows a structure where a common electrode 160 shown in FIG. 16 is removed, and FIG. 16 shows a structure where a black matrix (BM) 162 shown in FIG. 17 is removed.

In the liquid crystal panel 130F, the common electrode 160 is provided on an array substrate so as to overlap the pixel electrodes 152. The alignment of the liquid crystal is controlled by an electric field generated via slits of the common electrode 160 between the common electrode 160 and the pixel electrode 152. In the liquid crystal panel 130F, similar to the liquid crystal panel 130T described above, a pixel P is defined by an aperture portion of the black matrix 162 and is provided between adjacent drain lines 146. Each pixel P of the liquid crystal panel 130F has an identical size. Further, in each region 146B formed between adjacent drain lines 146, a pixel TFT 170 for a pixel, a pixel electrode 152, and the common electrode 160 are provided. Also, a color filter is formed in the aperture portion of the black matrix 162.

Techniques for widening the color gamut, in which the region of color reproductivity is increased by four colors, i.e. red (R), green (G), blue (B), and cyan (C), for example, have been known. However, when such a color gamut widening technology is employed, it is often necessary to reduce the aperture area of a pixel of a specific color as to adjust the chromaticity. In such a case, the black matrix of an opposing substrate or the metal line of a TFT substrate is used to shield a portion of the pixel P from light, thereby reducing the pixel aperture area.

FIGS. 18A and 18B illustrate the known chromaticity adjustment method described above, wherein FIG. 18A shows a structure prior to chromaticity adjustment, and FIG. 18B shows a structure after chromaticity adjustment. FIGS. 18A and 18B show an example in which the aperture ratio of each pixel before chromaticity adjustment is 60% and the pixel aperture area of a pixel Q for displaying a predetermined color is reduced to a half the aperture area of the adjacent pixel P for the purpose of chromaticity adjustment. In this case, the black matrix or the like is used to thereby set the aperture ratio of the pixel Q to 30%.

There are cases, however, where the brightness of a liquid crystal panel as a whole is reduced by shielding a pixel for the purpose of chromaticity adjustment described above. In the example shown in FIG. 1 8B, the brightness of the liquid crystal panel as a whole is greatly reduced because the aperture ratio of the panel is reduced to 45% after the chromaticity adjustment.

SUMMARY

Aspects of the invention advantageously provide a liquid crystal panel in which a reduction of the overall brightness of a liquid crystal panel can be prevented when an aperture area of a pixel is reduced for the purpose of chromaticity adjustment or the like.

According to an aspect of the invention, a liquid crystal panel includes a line extending between a first pixel and a second pixel that are adjacent to each other, a first pixel element portion for the first pixel, and a second pixel element portion for the second pixel. The first pixel element portion is provided on a side with respect to the line where the first pixel is disposed. The second pixel element portion is provided, along with the first pixel element portion, on the side with respect to the line where the first pixel is disposed.

BRIEF DESCRIPTION OF THE DRAWINGS

Exemplary embodiments of the invention will be described in detail based on the accompanying figures, wherein:

FIGS. 1A and 1B are charts for explaining a pixel of a liquid crystal panel according to an embodiment of the invention;

DESCRIPTION OF EXEMPLARY EMBODIMENTS

Figure 2:
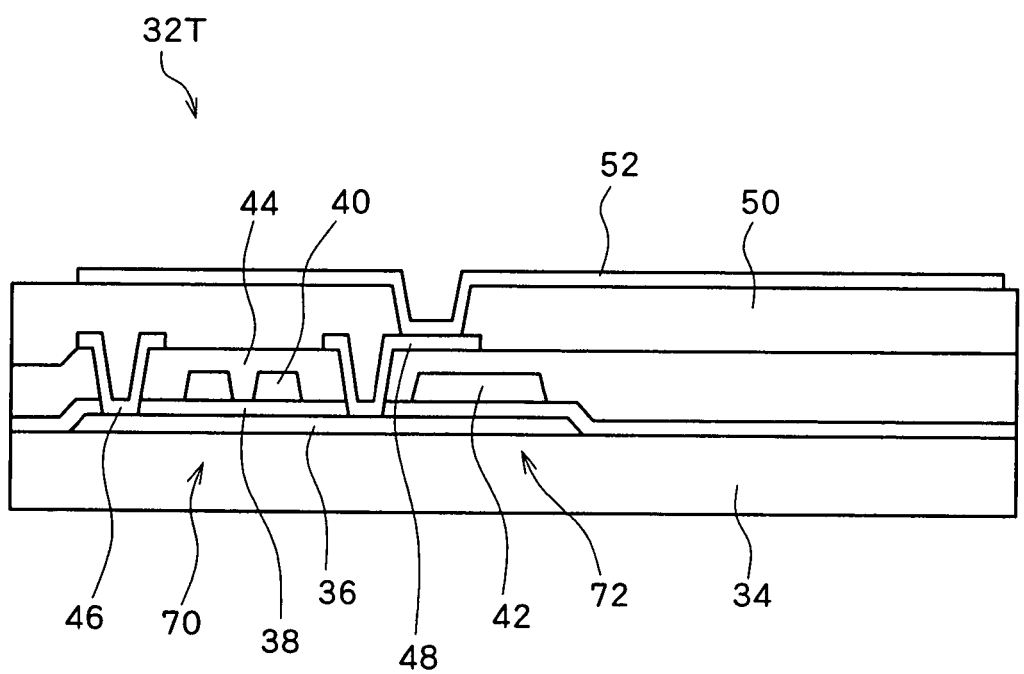
FIG. 2 is a cross sectional view illustrating a TN mode liquid crystal panel according to an embodiment of the invention.

FIGS. 1A and 1B are charts for explaining a pixel of a liquid crystal panel according to an exemplary embodiment of the invention. More specifically, FIG. 1B is a chart explaining a liquid crystal panel according to an exemplary embodiment of the invention, in which the aperture areas of pixels P1 and P2 are made to differ from each other for the purpose of chromaticity adjustment. For comparison, FIG. 1A illustrates a liquid crystal panel in which chromaticity adjustment is not performed and the aperture areas of all the pixels P are equal.

Here, in general, a pixel is visually identified as a minimum unit region in which the brightness is adjustable, when the display surface of a liquid crystal panel is viewed from the front. In each pixel, a colored region is set by a color filter (CF), for example, and each pixel displays a predetermined display color, such as one of red (R), green (G), blue (B), or cyan (C). Here, it should be noted that there are cases where a unit of color display is constituted by a collection of adjacent pixels of various colors and such a collection is in this description collectively referred to as a "pixel".

The outline, size, or the like of an aperture portion of each pixel can be defined by a black matrix (a light shielding film) or the like, an illustrative structure of which will be described below. A plurality of pixels are arranged within a region (referred to as a inter-line region) formed between center lines of a plurality of drain lines provided on an array substrate which will be described below, in the extending direction of the drain lines. The plurality of pixels arranged in the inter-line region are separated from each other by the black matrix or the like. In other words, each inter-line region is segmented into a plurality of regions in the extending direction of the drain lines, and each pixel is provided in each segment. Hereinafter, the segment will be referred to as a pixel disposing region. The pixel disposing regions may be defined in a matrix, for example, in the display region of a liquid crystal panel, and, in such a case, the pixels are also disposed in a matrix.

The portion of the pixel disposing region other than portions where the black matrix is provided and portions where light shielding elements within a pixel, such as a TFT, a storage capacitor, and lines, are provided, corresponds to the aperture portion of a pixel. Further, the area of the aperture portion corresponds to the pixel aperture area.

In the comparison example liquid crystal panel shown in FIG. 1A, all of the pixels P have an identical structure. FIG. 1A shows an example in which the area ratio of the aperture portion of the pixel P to the pixel disposing region, that is a pixel aperture ratio, is 60%. In this case, the aperture ratio of the liquid crystal panel itself (panel aperture ratio) is also approximately 60%.

On the other hand, as shown in FIG. 1B, a pixel P2 in the liquid crystal panel according to an embodiment of the invention has a structure in which some of the light shielding elements shown in the pixel P are not provided to that pixel, but are moved to an adjacent pixel P1. This arrangement can allow the pixel P2 to have a larger pixel aperture area, that is a higher pixel aperture ratio, than that of the pixel P. On the other hand, the pixel P1 is provided as a pixel for a predetermined display color, whose pixel aperture area, that is pixel aperture ratio, is lower than that of the pixel P2 for the purpose of chromaticity adjustment and so on. Here, some of the light shielding elements which have been moved to the pixel P1 are used to reduce the pixel aperture area of the pixel P1.

In the present example, the pixel P1 as described above is a pixel for displaying a color including a wavelength at which the spectrum intensity is higher than that of the pixel P2. That is, the color displayed by the pixel P1 has a spectrum in which the intensity of the pixel P1 is higher than that of the pixel P2 at a certain wavelength. For a liquid crystal panel for achieving color display by four colors, that is, red (R), green (G), blue (B), and cyan (C), for example, the display color of the pixel P1 may be green or cyan, and the display color of the pixel P2 may be blue or red. Such a configuration enables adjustments of the chromaticity.

Figure 18A:
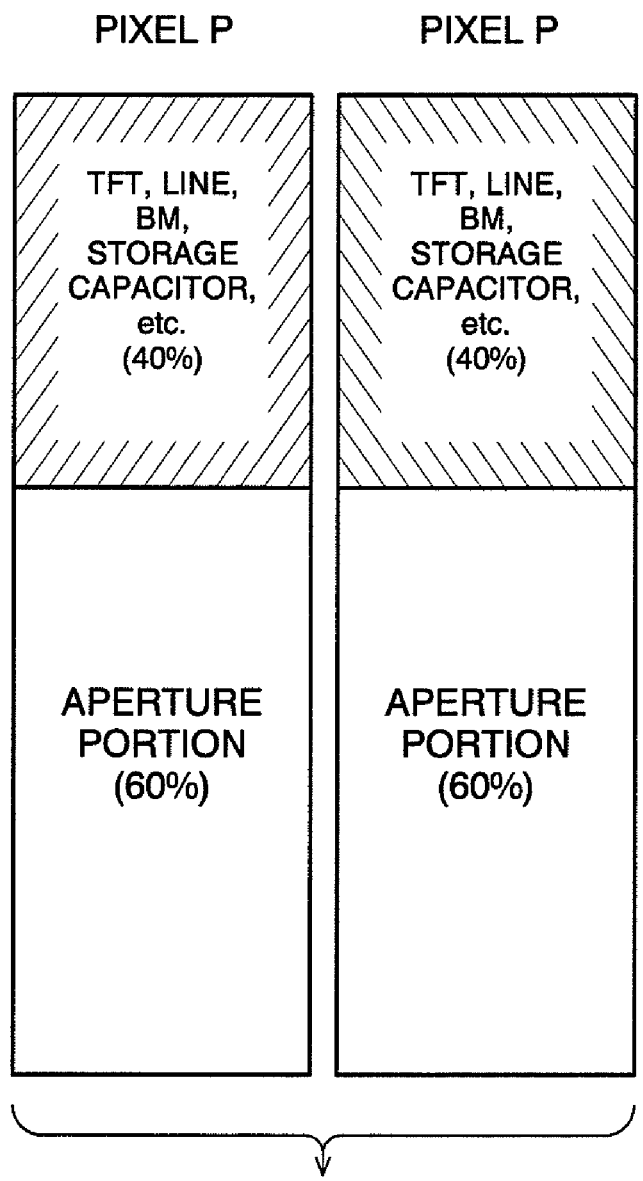
FIGS. 18A and 18B are charts for explaining a chromaticity adjustment method of related art.
Figure 18B:
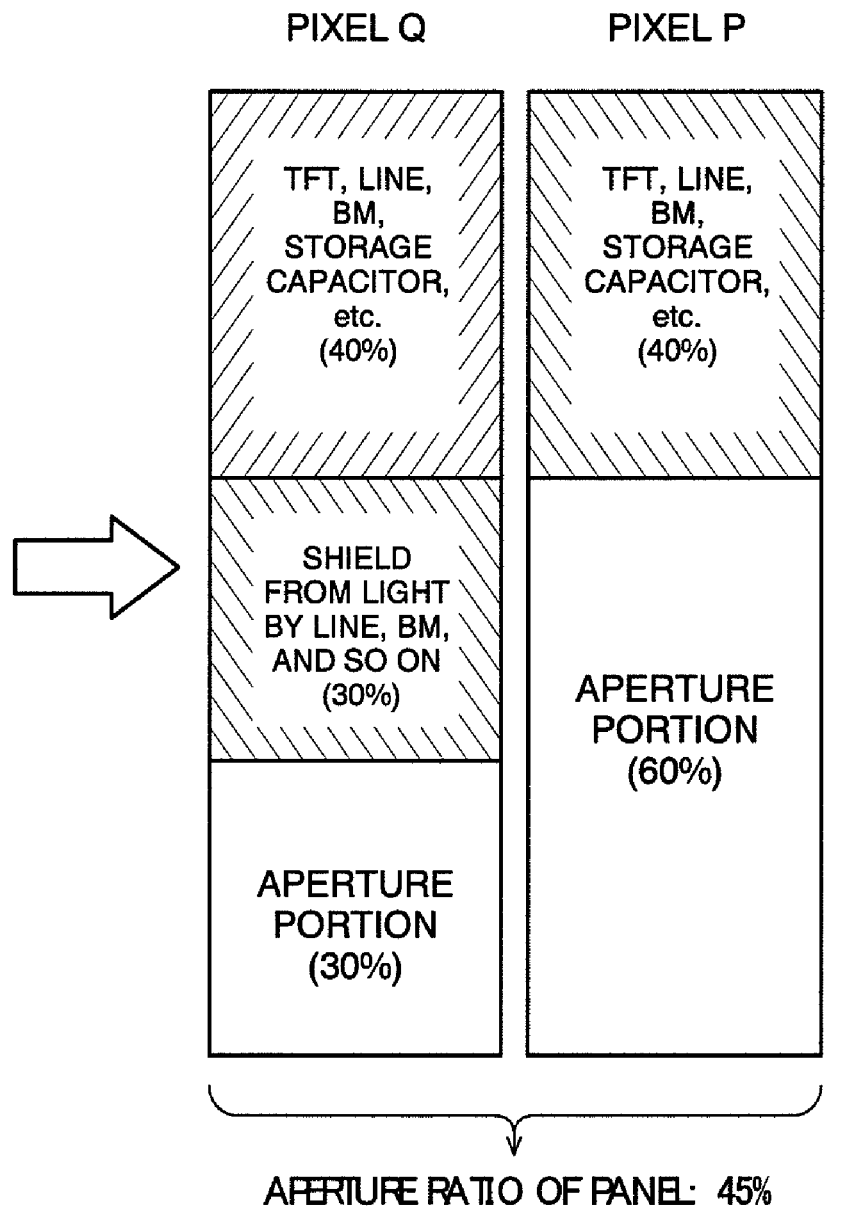

In a case where it is attempted to reduce the pixel aperture area of the pixel P1 to one half the pixel aperture area of the pixel P2 for the purpose of chromaticity adjustment, for example, a portion of the light shielding elements existing in the pixel P corresponding to 20% of the all light shielding elements are provided in pixel P1 rather than in pixel P2, giving the pixels P2 and P1 aperture ratios of 80% and 40%, respectively. When compared to a chromaticity adjustment method such as that shown in FIG. 18B, the aperture area of the pixel P2 is increased, and an amount of reduction in the aperture area of the pixel P1 can be smaller with an increase in the aperture area of the pixel P2.

Further, in the above example, the panel aperture ratio is 60%, which is equal to the aperture ratio of a liquid crystal panel in which no chromaticity adjustment is performed (see FIG. 1A). In other words, in a liquid crystal panel according to an embodiment of the invention, chromaticity adjustment can be performed without reducing the brightness of the liquid crystal panel as a whole, or the brightness of the liquid crystal panel as a whole can be increased compared to the chromaticity adjustment method of related art.

Figure 3:
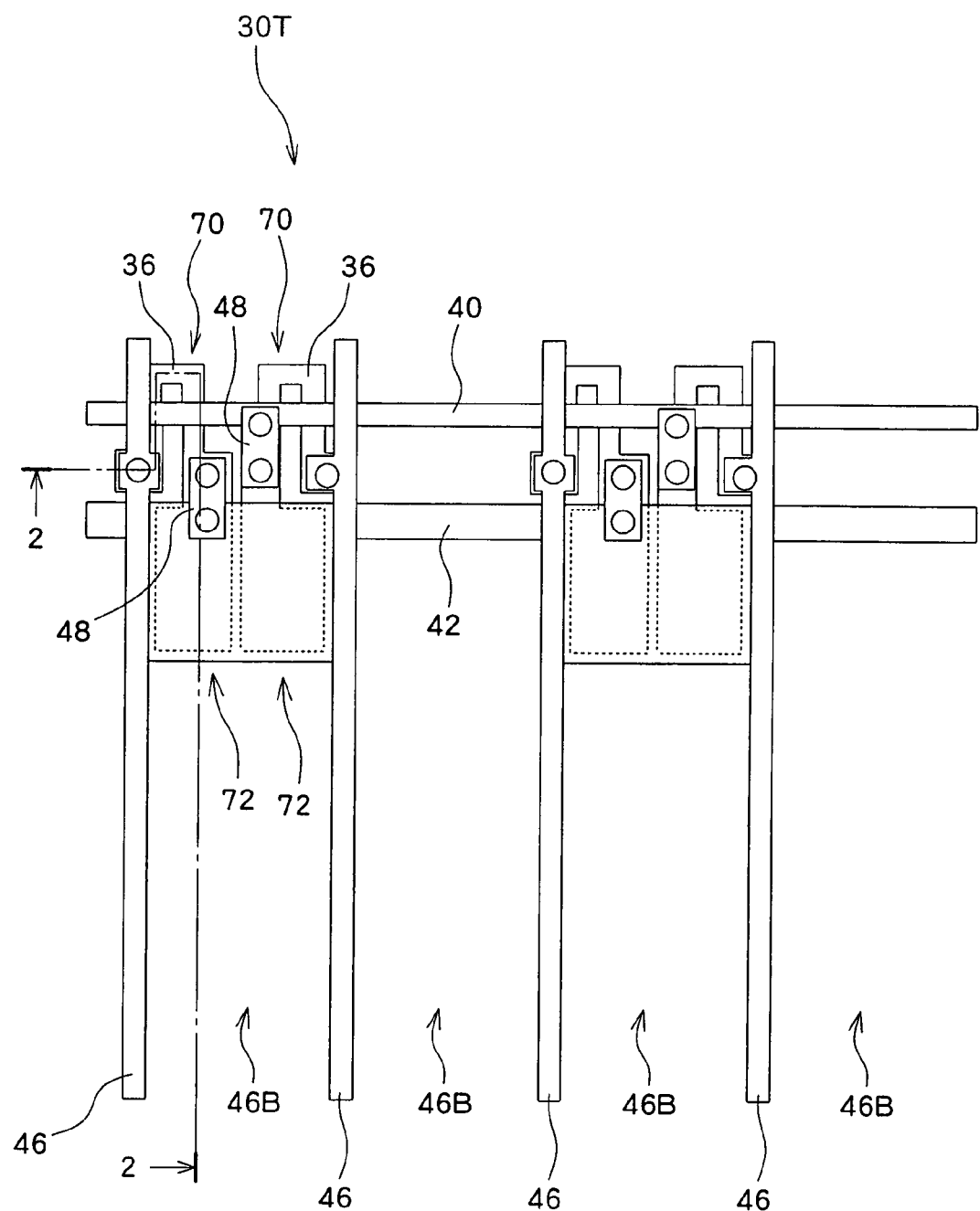
FIGS. 3 to 5 are plan views illustrating a TN mode liquid crystal panel according to an embodiment of the invention.
Figure 4:
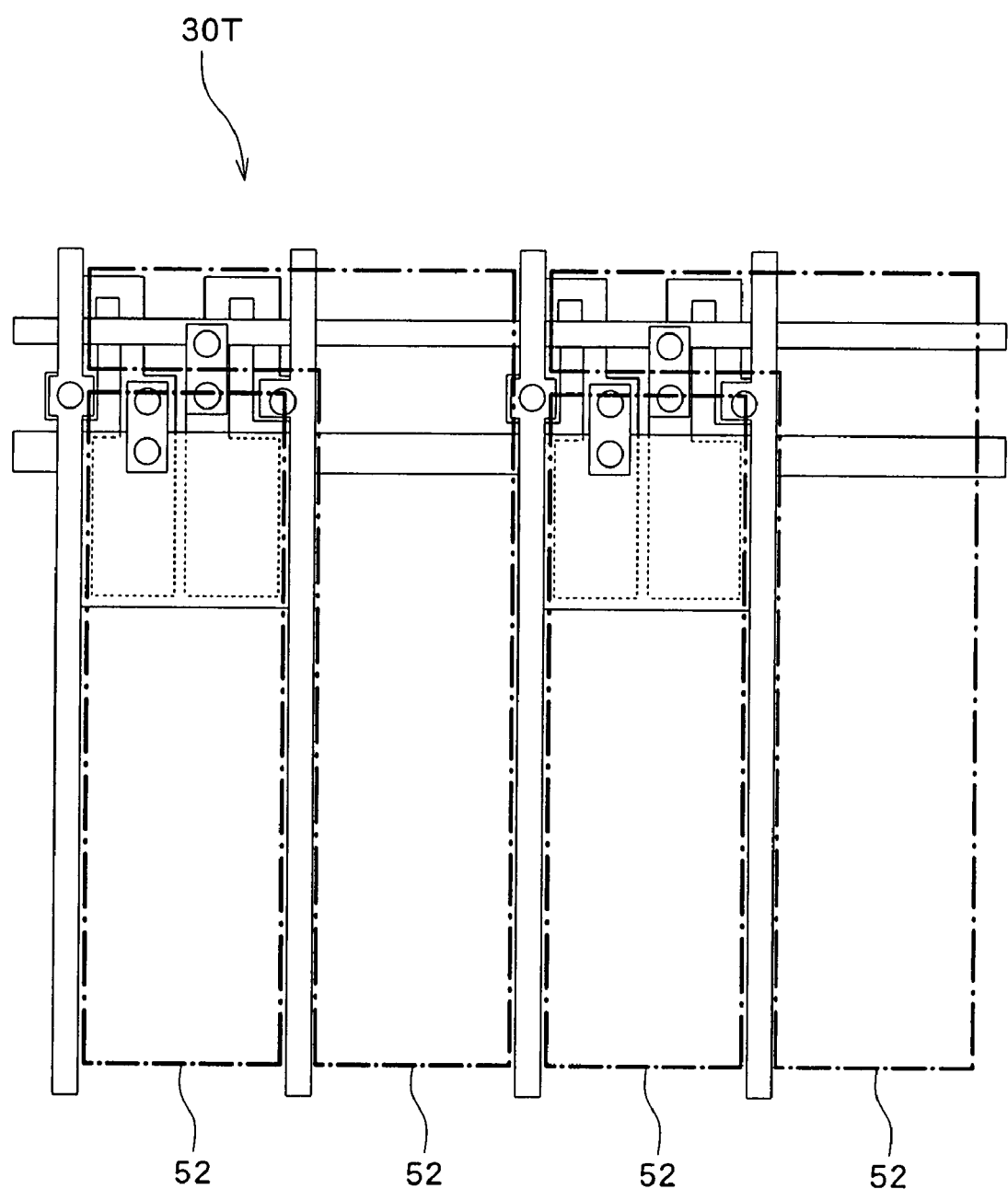
Figure 5:
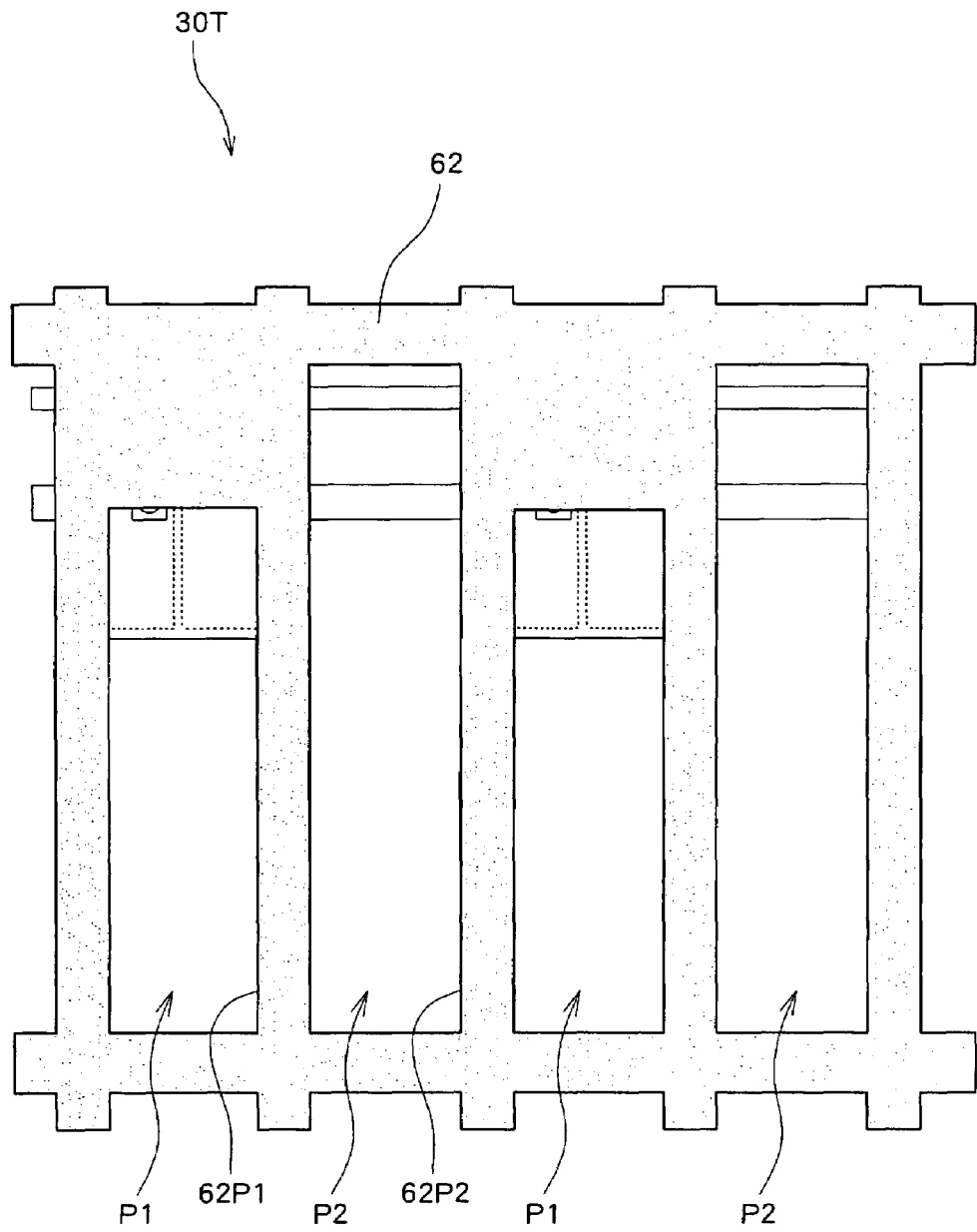

FIG. 2 shows a cross sectional view for explaining an array substrate 32T with regard to a TN mode liquid crystal panel 30T which is one example of a liquid crystal panel according to an embodiment of the invention. FIGS. 3 to 5 show plan views (layout diagrams) for explaining the display region corresponding to four pixels of the liquid crystal panel 30T. Here, FIG. 2 is a cross sectional view taken along line 2-2 of FIG. 3.

The liquid crystal panel 30T has a structure in which liquid crystal, which is not shown, is disposed between an array substrate 32T and an opposing substrate, also not shown, that are disposed opposite to each other. In the liquid crystal panel 30T, the alignment of liquid crystal is controlled by an electric field generated between a pixel electrode 52 of the array substrate 32T and a common electrode (not shown) of the opposing substrate, so that the brightness of the pixel is adjusted. The liquid crystal panel 30T is also applicable to a VA (Vertical Alignment) mode, a ECB (Electrically Controlled Birefringence) mode, and so on, as well as to the TN mode.

Referring first to FIG. 2, the sectional structure of the array substrate 32T will be described.

The array substrate 32T includes a transparent substrate 34, a semiconductor layer 36, a gate insulating film 38, a gate line 40, a storage capacitor line 42, an interlayer insulating film 44, a drain line 46, a source electrode 48, a planarization film 50, and a pixel electrode 52.

The transparent substrate 34 is formed of glass, for example. The semiconductor layer 36 is formed of poly silicon, for example, and is disposed on the transparent substrate 34. The gate insulating film 38, which is formed of silicon oxide, silicon nitride, or the like, for example, is disposed on the substrate 34 so as to cover the semiconductor layer 36. The gate line is formed of a metal such as Mo, Al, or the like. The gate line 40 is disposed on the gate insulating film 38 so as to be opposed to the semiconductor layer 36, and, with the gate insulating film 38 and the semiconductor layer 36, forms a pixel TFT 70. Here, the gate line 40 is also referred to as a scan line. The storage capacitor line 42 may be formed of the same material as that of the gate line 40, for example. The storage capacitor line 42 is disposed on the gate insulating film 38 so as to be opposed to the semiconductor layer 36, and with the gate insulating film 38 and the semiconductor layer 36, forms a storage capacitor 72.

The interlayer insulating film 44, which is formed of silicon oxide, silicon nitride, or the like, is disposed on the gate insulating film 38 so as to cover the gate line 40 and the storage capacitor line 42. Contact holes are provided through the interlayer insulating film 44 and the gate insulating film 38. The contact holes are provided at locations in the semiconductor layer 36 corresponding to a source and a drain of the pixel TFT 70, respectively. The drain line 46 is formed of a metal such as Mo, Al, Ti, or the like. The drain line 46 is disposed on the interlayer insulating film 44 and also is connected with the semiconductor layer 36 via one of the contact holes. Here, the drain line 46 is also referred to as a signal line. The source electrode 48 may be formed of the same material as that of the drain line 46, for example. The source electrode 48 is disposed on the interlayer insulating film 44 and is also connected with the semiconductor layer 46 via the other one of the contact holes.

While in this example a portion in the semiconductor layer 36 to which the drain line 46 is connected is designated as a drain of the pixel TFT 70 and a portion in the semiconductor layer 36 to which the pixel electrode 52 is connected via the source electrode 48 is designated as a source of the pixel TFT 70, the drain and the source may be designated in a reverse manner. Further, in order to connect the storage capacitor 72 with the source of the pixel TFT 70, the storage capacitor line 42 is opposed to the semiconductor layer 36 on the source side of the semiconductor layer 36.

The planarization film 50 is formed of an insulating transparent resin such as acryl or the like, and is disposed on the interlayer insulating film 44 so as to cover the drain line 46 and the source electrode 48. A contact hole is provided above the source electrode 48 through the planarization film 50. The pixel electrode 52 may be formed of a transparent material such as ITO (Indium Tin Oxide), for example. The pixel electrode 52 is disposed on the planarization film 52 and is also connected with the source electrode 48 via the contact hole described above.

With the above structure, in the liquid crystal panel 30T, the drain line 46 and the pixel electrode 52 are connected electrically (in a circuit structure) with each other via the pixel TFT 70 and the source electrode 48, and the drain line 46 and the storage capacitor 72 are connected electrically (in a circuit structure) with each other via the pixel TFT 70. Accordingly, a potential applied to the drain line 46 is applied, via the pixel TFT 70, to the pixel electrode 52 and the storage capacitor 72.

Referring now to FIGS. 3 to 5, the structure layout as viewed from the front of the display region corresponding to four pixels of the liquid crystal panel 30T will be described. Here, in order to facilitate explanation, FIG. 3 shows a structure in which the pixel electrode 52 shown in FIG. 4 is removed, and FIG. 4 shows a structure in which the black matrix shown in FIG. 5 is removed. Further, in FIGS. 3 to 5, the substrate 34 or the like is omitted. In addition, while FIG. 4 shows the pixel electrode 52 in a bold dashed-dotted line and FIG. 5 shows the black matrix 62 which is blacked out, these features are highlighted only for the purpose of clarification of the drawings.

In the liquid crystal panel 30T, each of a plurality of drain lines 46 extends linearly. (In the illustrated example, each drain line extends in the vertical direction.) The plurality of drain lines 46 are arranged in the direction intersecting with (orthogonal to, in this example) the extending direction of the drain lines 46 (which is, in this example, the horizontal direction), in parallel to each other. In the shown example, the arrangement pitch of each drain line 46 is identical for all the plurality of drain lines 46, further, the width of each drain line 46 (i.e. the size of the line 46 in the arranging direction) is also identical. Also, while in the illustrated example, the drain line 46 is shown as a straight line, the drain line 46 need not be perfectly straight, but may at points divert in various directions as long the line generally and eventually extends in the noted intended direction. Moreover, the pixel arrangement may also be a stripe arrangement, a delta arrangement, a mosaic arrangement, and so on.

With these plurality of drain lines 46, a plurality of pixel disposing regions 46B are defined in the arranging direction of the drain lines 46. With regard to these plural pixel disposing regions 46B, two pixel TFTs 70 for pixels P1 and P2 are disposed in every other region. More specifically, a pixel disposing region 46B in which two pixel TFTs 70 are disposed and a pixel disposing region 46B in which no pixel TFTs 70 are disposed are arranged alternately in the arranging direction of the drain lines 46. Here, all the pixel disposing regions 46B arranging in the extending direction of the drain lines 46 need not be the pixel disposing regions 46B including no pixel TFTs 70, for example, and the pixel disposing region 46B in which no pixel TFTs 70 are disposed and the pixel disposing region 46B in which the pixel TFTs are disposed may be arranged alternately in the extending direction of the drain lines 46.

In the illustrated example, with regard to each pixel TFT 70, the semiconductor layer 36 extends in a substantially U shape (in the drawing, the substantially U shape is shown opening towards the bottom of the drawing), and the gate line 40 extends in the arranging direction of the drain lines 46, that is, in the direction intersecting with the drain lines 46, across the two arm portions of the substantially U shape. With this structure, the source and the drain of each pixel TFT 70 are located on the same side, that is, on one side, with respect to the gate line 40. Consequently, the pixel TFT 70 has a structure in which the gate line 40 intersects with the semiconductor layer 36 twice between the source and the drain, that is a structure in which two gate electrodes are provided between the source and the drain of the semiconductor layer 36. Here, the gate line 40 is provided in common for the two pixel TFTs 70 described above. Further, the source and the drain of the pixel TFT 70 for the pixel P1 and the source and the drain of the pixel TFT 70 for the pixel P2 are provided on one side with respect to the gate line 40.

In the drawings, with regard to the two pixel TFTs 70 described above, the semiconductor layer 36 of one pixel TFT 70 (located to the left in the shown example) partially overlaps the drain line 46, and the semiconductor layer 36 of the other pixel TFT 70 (located to the right in the shown example) does not overlap the drain line 46. However, the semiconductor layers of both the two pixel TFTs 70 may overlap the drain line 46 or the semiconductor layers of neither the two pixel TFTs 70 may overlap the drain line 46.

The two pixel TFTs 70 described above are arranged in the arranging direction of the drain line 46 in the pixel disposing region 46B. With regard to each of the two pixel TFTs 70, the source is provided toward the center of the pixel disposing region 46B and the drain is provided toward the drain line 46. The respective drains of the two pixel TFTs 70 are connected with the nearest drain lines 46, so that the two pixel TFTs 70 are connected to different drain lines 46. Specifically, the pixel TFT 70 for the pixel P2 is connected with the drain line 46 extending between the pixels P1 and P2, and the pixel TFT 70 for the pixel P1 is connected with the drain line 46 adjacent to the drain line 46 to which the pixel TFT for the pixel P2 is connected. Each source is connected to the pixel electrode 52 via the source electrode 48 and is also connected to the storage capacitor 72. The pixel electrode 52 and the storage capacitor 72 connected to one pixel TFT 70 are not connected with those connected with the other pixel TFT 70.

The overall region of the pixel electrode 52 which is connected with the one pixel TFT 70 (the pixel TFT on the left in the illustrated example) is provided within the pixel disposing region 46B in which the two pixel TFTs described above are disposed. Here, while in the illustrated example the edge of the pixel electrode 52 does not overlap the drain line 46, the pixel electrode 52 may have a size in which the edge thereof overlaps the drain line 46.

On the other hand, the pixel electrode 52 which is connected with the other pixel TFT 70 (the pixel TFT on the right in the illustrated example) is connected with the other pixel TFT 70 in the pixel disposing region 46B in which the two pixel TFTs 70 described above are disposed. As such, both the pixel electrode 52 for the pixel P1 and the pixel electrode 52 for the pixel P2 are connected to the corresponding pixel TFTs 70 on the side with respect to the drain line 46 where the pixel P1 is disposed. The pixel electrode 52 which is connected with the other pixel TFT 70 described above extends across the drain line 46 to which the other pixel TFT 70 is connected, to reach an adjacent pixel disposing region 46B (the pixel disposing region 46B in which no pixel TFTs 70 are disposed described above), and extends within this adjacent pixel disposing region 46B. Accordingly, this pixel electrode 52 has a substantially L shape (the L shape is shown upside down in the drawings). Further, a portion of the L shape pixel electrode 52 disposed within the pixel disposing region 46B in which no pixel TFTs 70 are disposed is longer in the extending direction of the drain line 46 and is therefore larger than the pixel electrode 52 disposed within the pixel disposing region 46B in which the pixel TFTs 70 are disposed. Here, while in the shown example, the edges of the substantially L shape pixel electrode 52, except the portion extending across the drain line 46, do not overlap the drain line 46, the pixel electrode 52 may be of a size such that the edges overlap the drain lines 46.

In the pixel disposing region 46B in which two pixel TFTs 70 are disposed, the above-described two storage capacitors 72 for the pixels P1 and P2 are disposed side by side in the arranging direction of the drain lines 46. Each storage capacitor 72 is disposed in line with the corresponding pixel TFT 70 in the extending direction of the drain line 46. Here, because the sources for the pixel P1 and P2, to which the storage capacitors 72 are respectively connected, are provided on one side with respect to the gate line 40 as described above, both the storage capacitors 72 for the pixels P1 and P2 are provided on one side with respect to the gate line 40.

The black matrix 62 is formed of a layered film of chromium and chromium oxide, for example, and is provided on the opposing substrate. The black matrix 62 is provided between the pixel electrodes 52 adjacent to each other, such that an opening 62P1 or an opening 62P2 is provided corresponding to each pixel disposing region 46B. With such a configuration, the black matrix 62 is provided along and overlapping each drain line 46. Of the openings 62P1 and 62P2, the opening 62P1 is provided in the pixel disposing region 46B in which the two pixel TFTs 70 are disposed, so as to correspond to the pixel electrode 52, and defines the outline of the pixel P1. The other opening 62P2 is provided in the pixel disposing region 46B in which no pixel TFTs 70 are disposed, so as to correspond to the pixel electrode 52, and defines the outline of the pixel P2. In the liquid crystal panel 30T, because the black matrix 62 is provided in a portion in the pixel disposing region 46B including the two pixel TFTs 70 which corresponds to the region where the two pixel TFTs 70 and the substantially L-shaped pixel electrode 52 are disposed, the opening 62P2 is larger than the opening 62P1. That is, the pixel P2 is larger than the pixel P1.

Because the drain line 46, the gate line 40, the storage capacitor line 42, and the source electrode 48 shield light in a manner similar to that of the black matrix, these components can be used in conjunction with the black matrix to define the opening of a pixel.

With regard to the liquid crystal panel 30T, when the pixel TFT 70 and the storage capacitor 72 are collectively referred to as a pixel element portion, the pixel element portion for the pixel P2 is provided, along with the pixel element portion for the pixel P1, in the pixel disposing region 46B where the pixel P1 is disposed. In other words, the pixel element portion for the pixel P2 is disposed on the side of the pixel P1 with respect to the drain line 46 (i.e. using the drain line 46 a reference line), and is not disposed on the side of the pixel P2. Consequently, the pixel element portion for the pixel P2 is not used for shielding the pixel P2 from light. More specifically, in the illustrated example, the pixel P2 (that is, the opening 62P2) is shielded from light only by the gate line 40 and the storage capacitor line 42 overlapping the pixel P2. Accordingly, the opening area of the pixel P2 is larger than that of the pixel P1, and is also larger than that of the liquid crystal panel 130T of related art.

For reducing the aperture area of the pixel P1 compared to the aperture area of the pixel P2 at a predetermined ratio for the purpose of chromaticity adjustment or the like, in the liquid crystal panel 30T, the aperture area of the pixel P2 may be increased as described above. When compared to a chromaticity adjustment method (see FIG. 18B), an amount of reduction in the aperture area of the pixel P1 can be smaller. When this is done, chromaticity adjustment or the like can be achieved without reducing the overall brightness of the liquid crystal panel. Alternatively, the brightness of the liquid crystal panel as a whole can even be increased compared to that achieved in the chromaticity adjustment method of related art.

Figure 6:
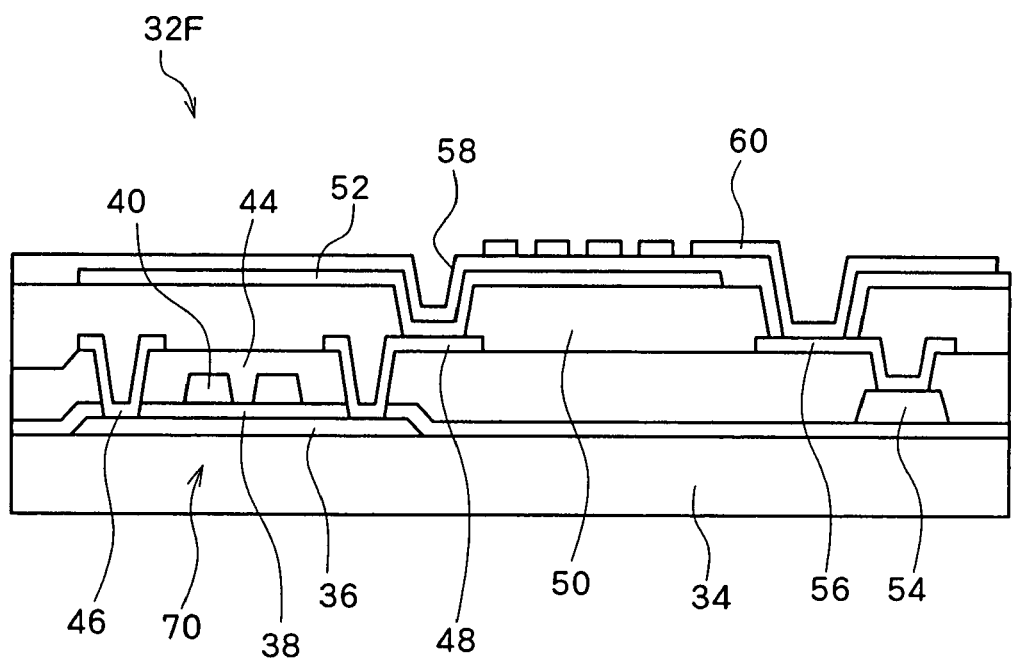
FIG. 6 is a cross sectional view illustrating an FFS mode liquid crystal panel according to an embodiment of the invention.

FIG. 6 is a cross sectional view for explaining an array substrate 32F with regard to an FFS mode liquid crystal panel 30F which is another example liquid crystal panel according to the invention. FIGS. 7 to 10 are plan views (layout views) for explaining the display region corresponding to four pixels of the liquid crystal panel 30F. Here, FIG. 6 is a cross sectional view along line 6-6 of FIG. 7.

The liquid crystal panel 30F has a structure in which liquid crystal, which is not shown, is disposed between the array substrate 32F and an opposing substrate, also not shown, that are opposed to each other. In the liquid crystal panel 30F, the alignment of the liquid crystal is controlled by an electric filed generated between the pixel electrode 52 and the common electrode 60 of the array substrate 32F, so that the brightness of a pixel is adjusted.

Referring first to FIG. 6, the sectional structure of the array substrate 32F will be described.

The array substrate 32F has a structure in which, with respect to array substrate 32T (see FIG. 2), the storage capacitor line 42, that is, the storage capacitor 72 is removed, and a common electrode line 54, an intermediate 56 electrode for common electrode, and an FFS insulating film 58, and the common electrode 60 are additionally provided.

The common electrode line 54, which may be formed of the same material as that of the gate line 40, for example, is disposed on the gate insulating film 38 and is covered with the interlayer insulating film 44. A contact hole reaching the common electrode line 54 is provided through the interlayer insulating film 44. The intermediate electrode 56 for common electrode may be formed of the same material as that of the drain line 46, for example. The intermediate electrode 56 for common electrode is disposed on the interlayer insulating film 44 and is connected with the common electrode line 54 via the contact hole.

The FFS insulating film 58 may be formed of silicon nitride, for example, and is disposed on the planarization film 50 so as to cover the pixel electrode 52. A contact hole reaching the intermediate electrode 56 for common electrode is provided through the planarization film 50, and the FFS insulating film 58 is provided along the side walls of the contact hole. The common electrode 60 may be formed of a transparent material such as ITO, for example. The common electrode 60 is disposed on the FFS insulating film 58 and is also connected with the intermediate electrode 56 for common electrode via the contact hole. The common electrode 60 is provided so as to be opposed to the pixel electrode 52 with the FFS insulating film 58 being interposed therebetween, and includes a plurality of slits in a region where the common electrode 60 is opposed to the pixel electrode 52. The alignment of the liquid crystal is controlled by an electric field generated between the pixel electrode 52 and the common electrode 60 via these slits.

Figure 7:
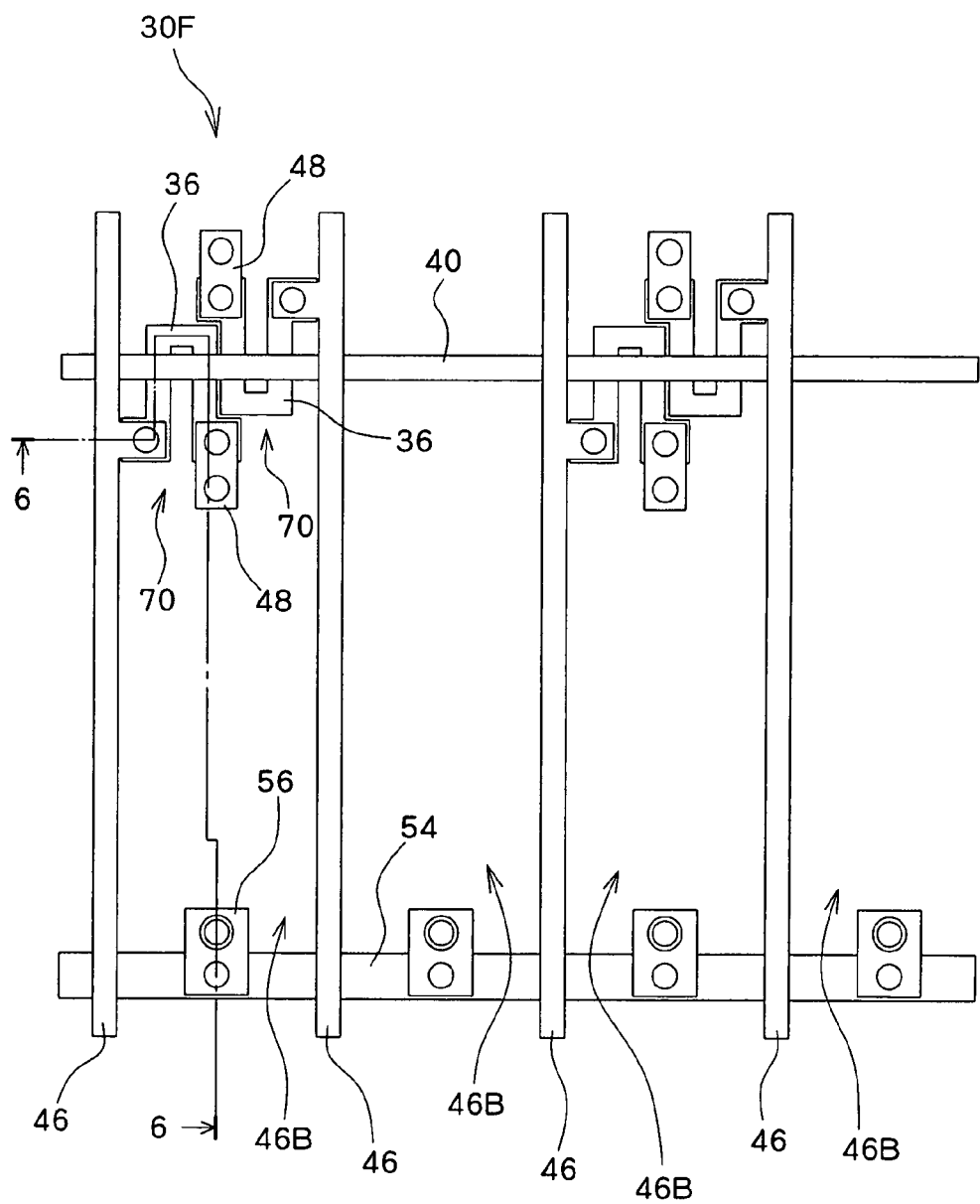
FIGS. 7 to 10 are plan views illustrating an FFS mode liquid crystal panel according to an embodiment of the invention.
Figure 8:
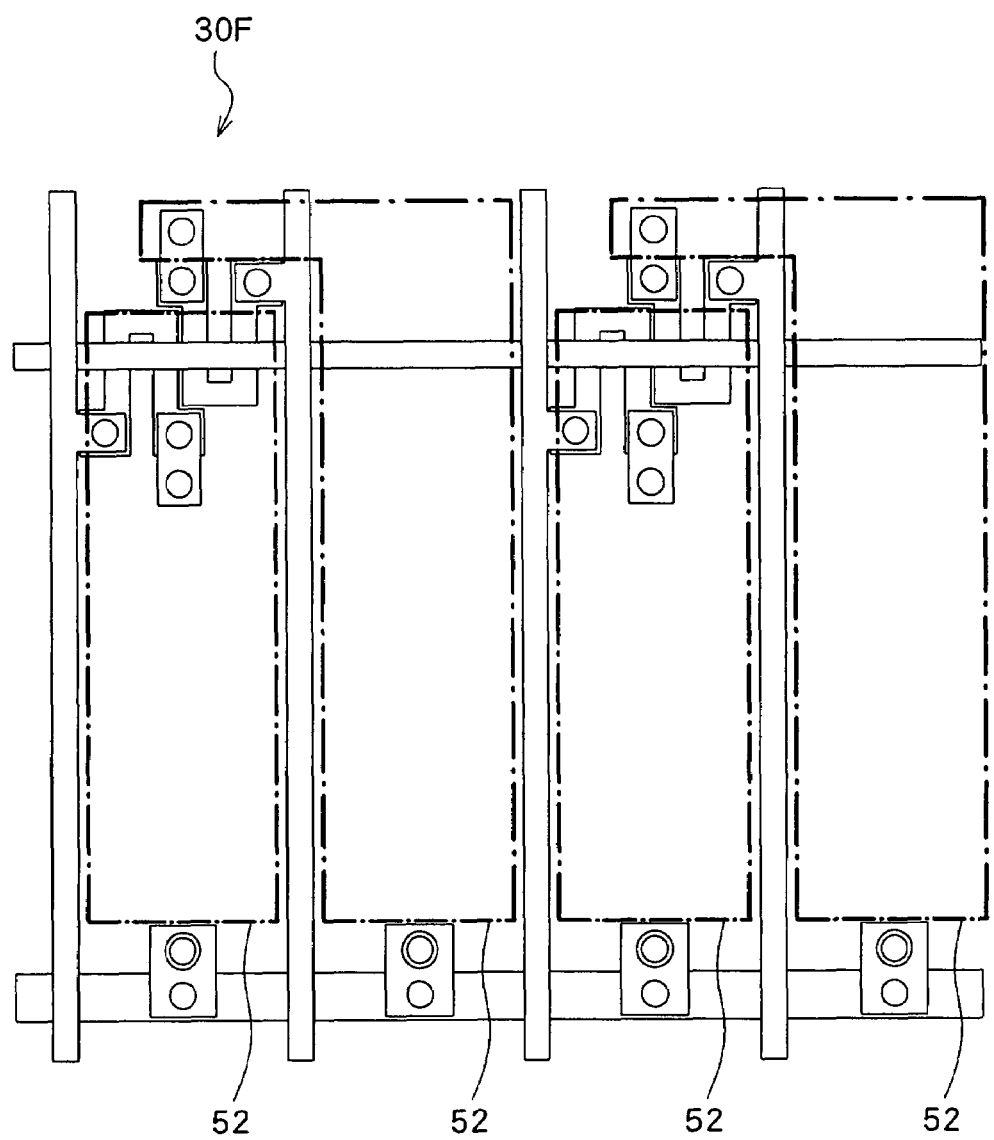
Figure 9:
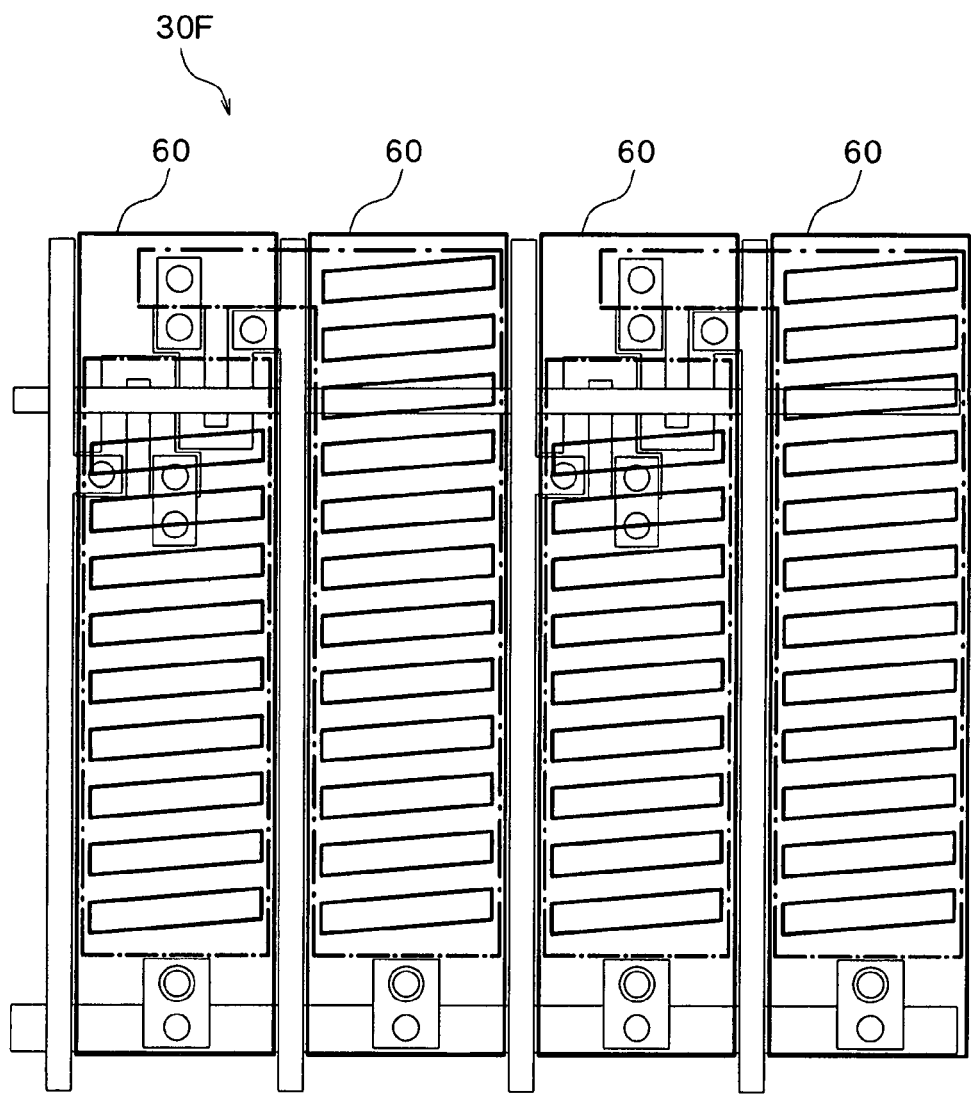
Figure 10:
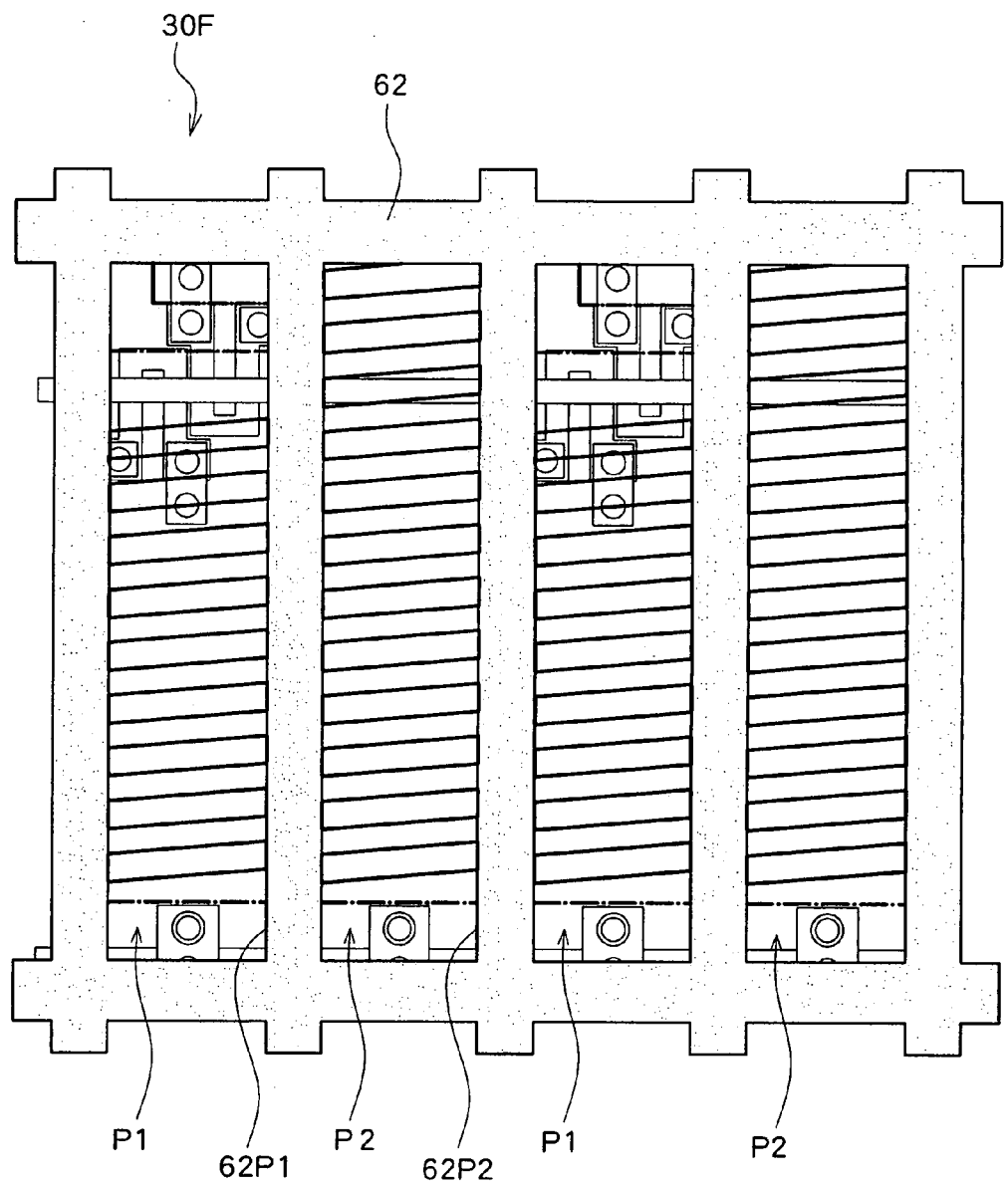
Figure 11:
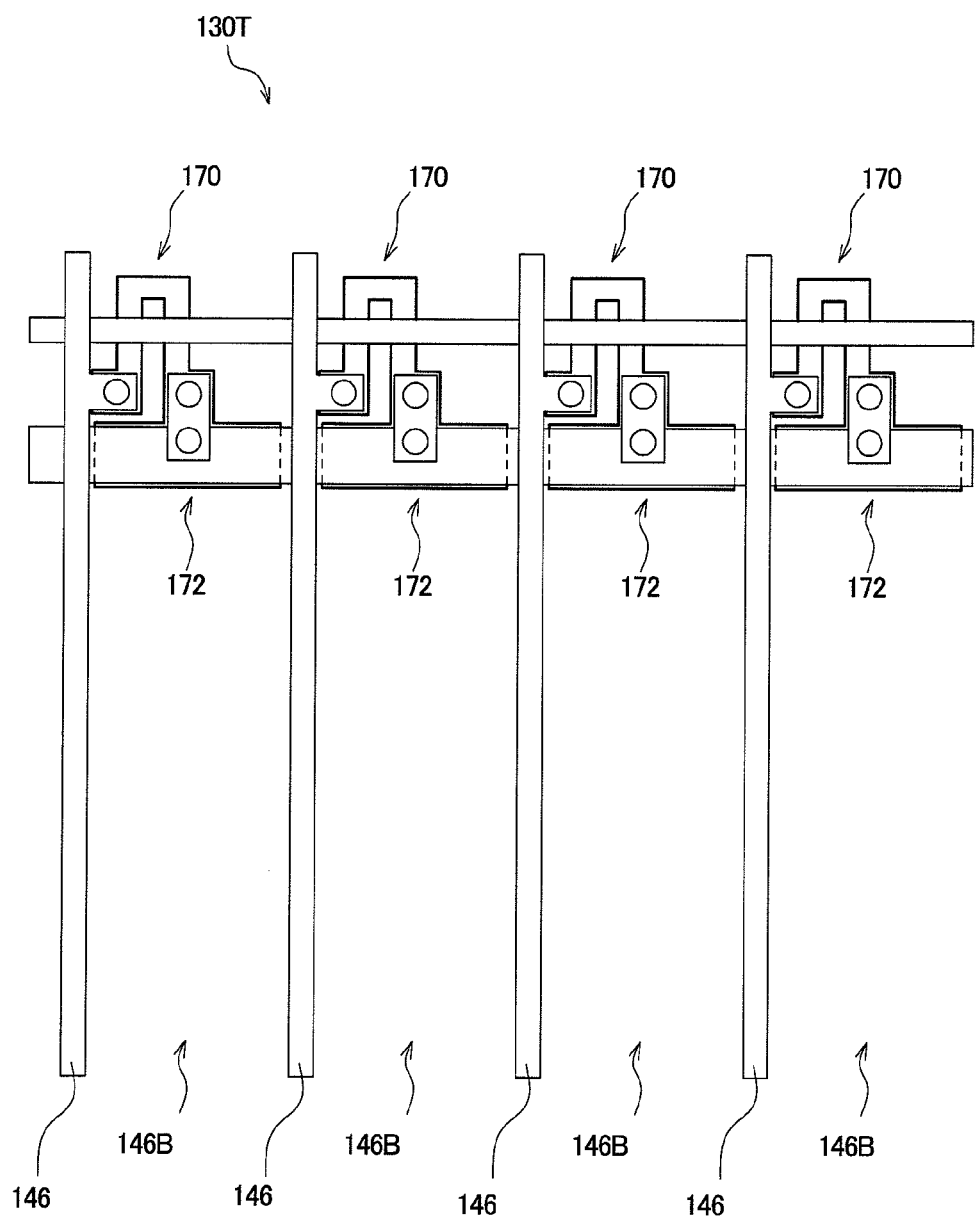
FIGS. 11 to 13 are plan views illustrating a TN mode liquid crystal panel of related art.
Figure 12:
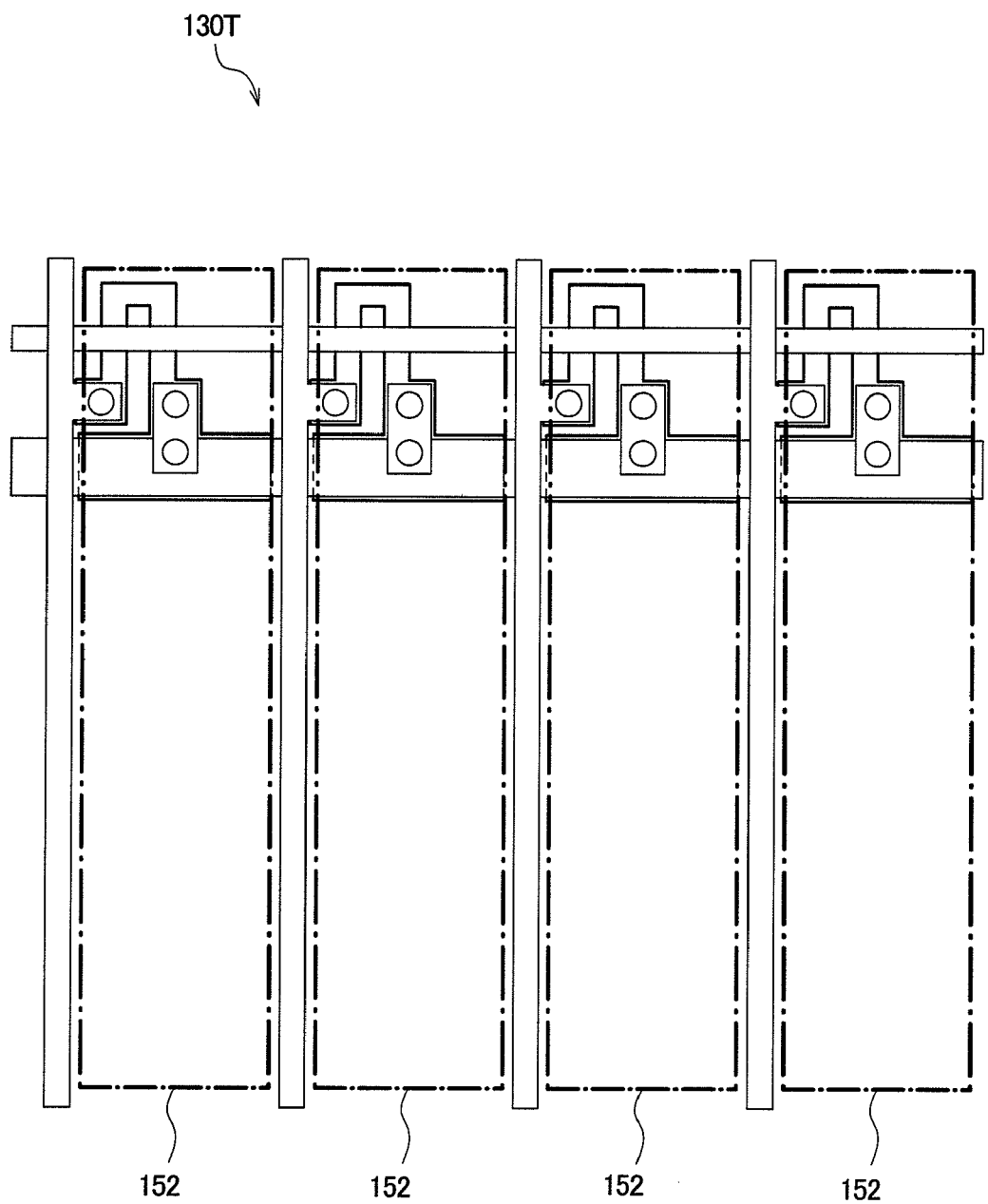
Figure 13:
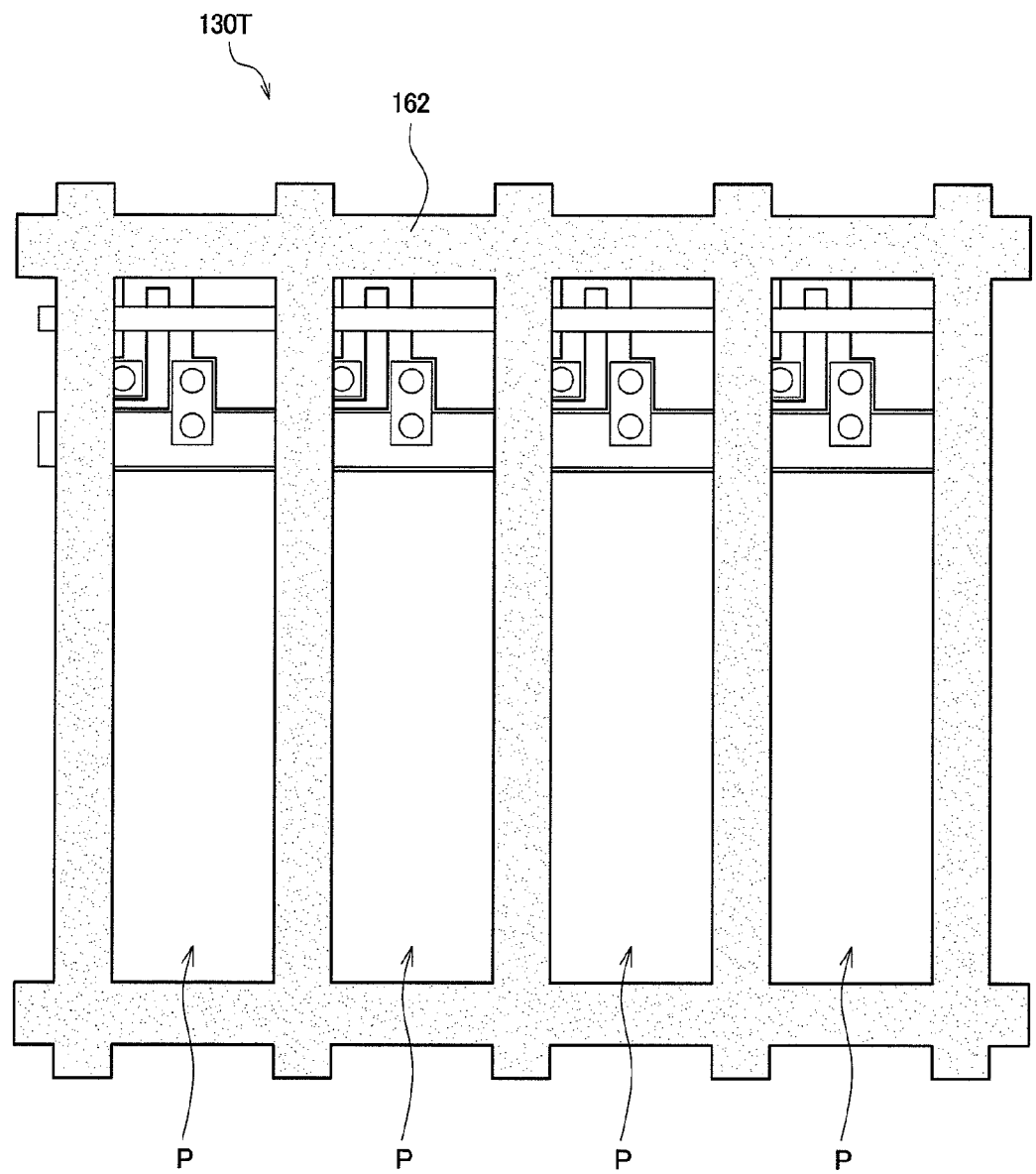
Figure 14:
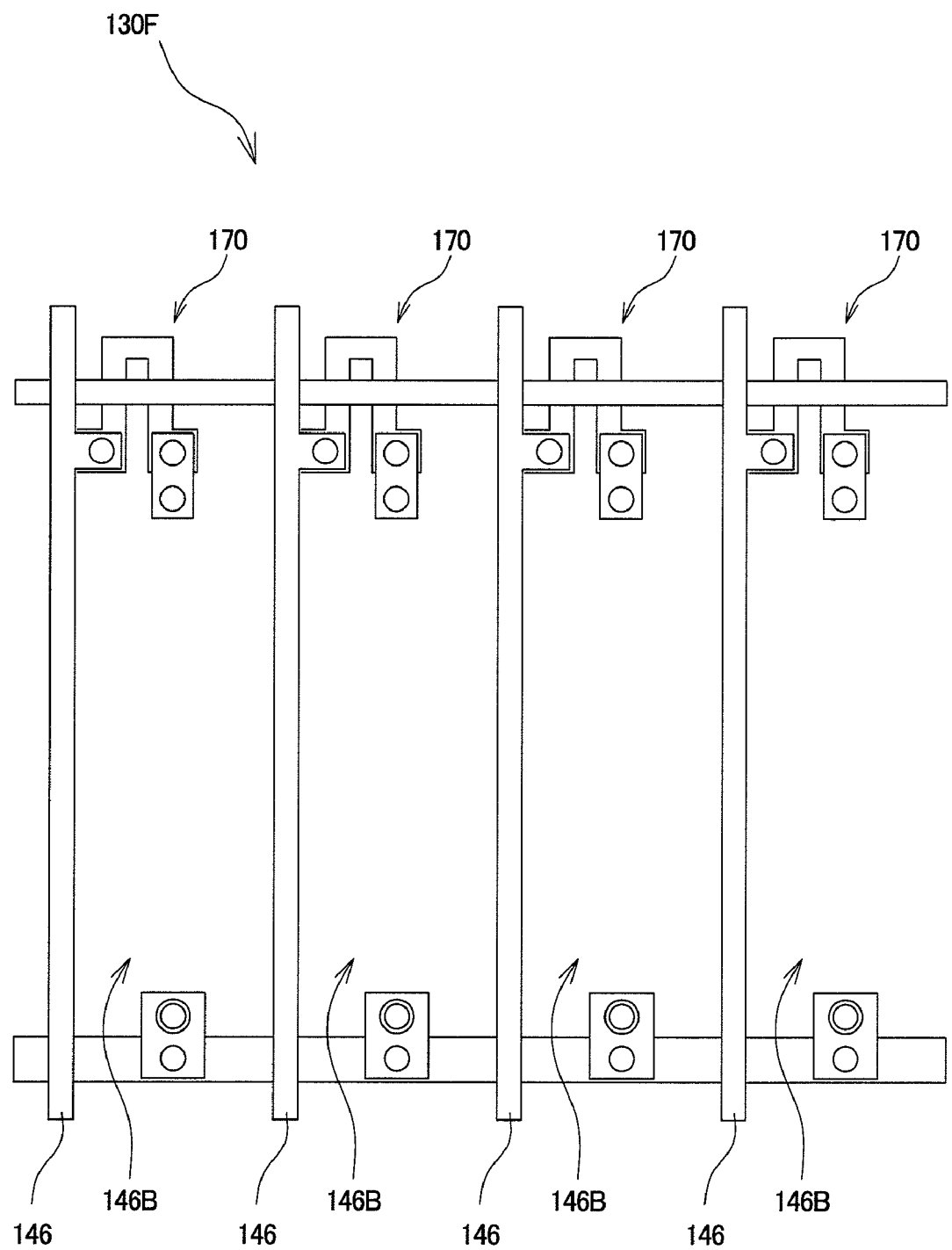
FIGS. 14 to 17 are plan views illustrating an FFS mode liquid crystal panel of related art.
Figure 15:
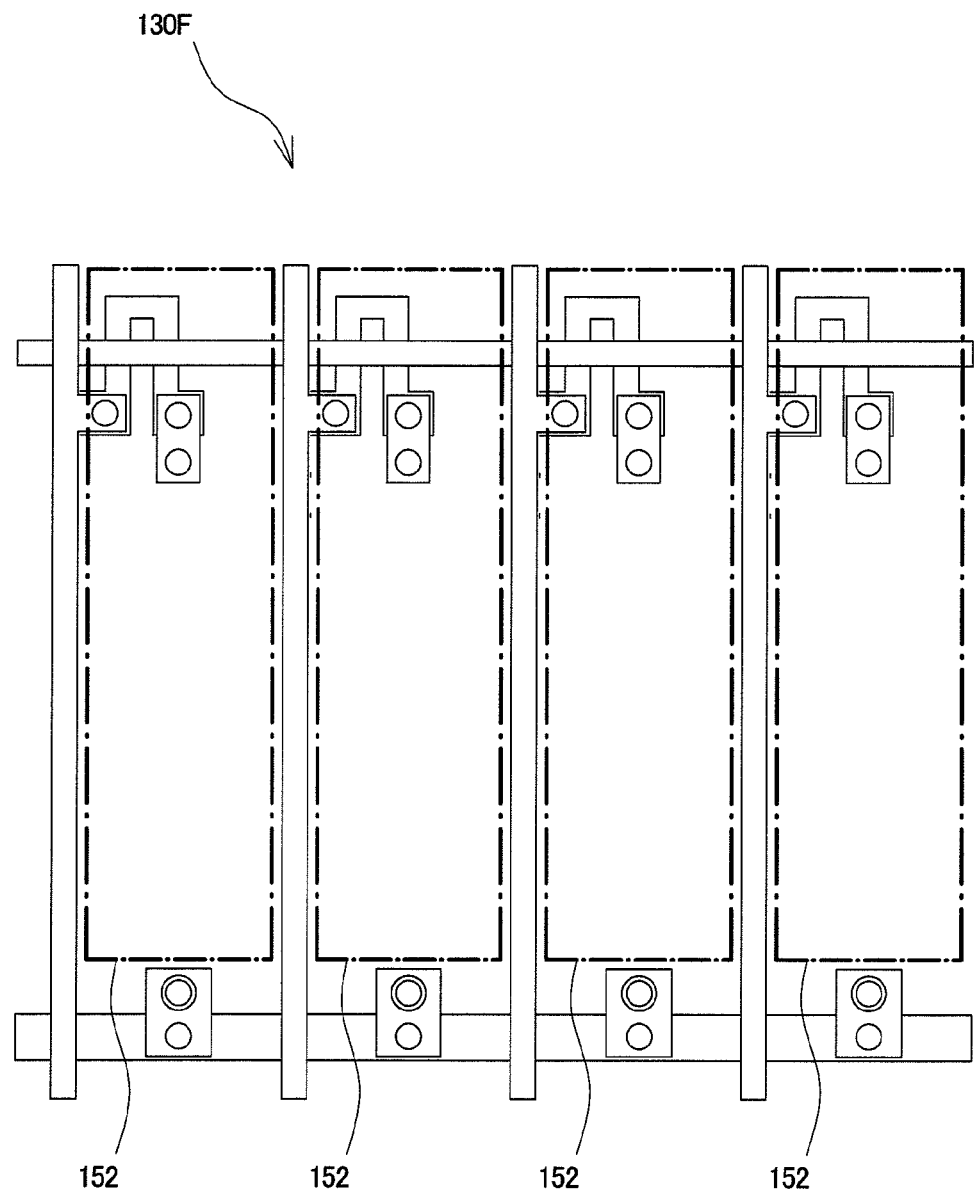
Figure 16:
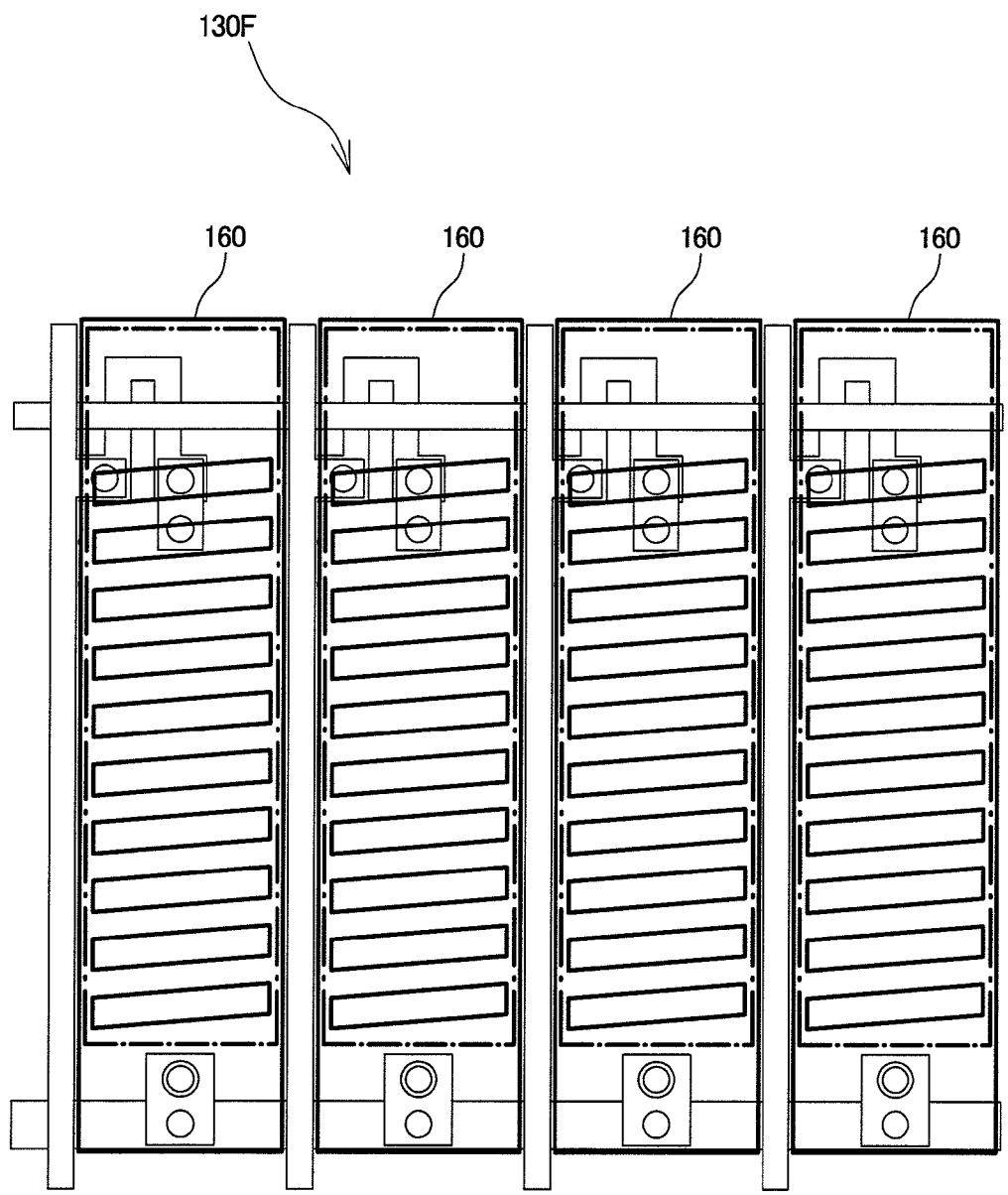
Figure 17:
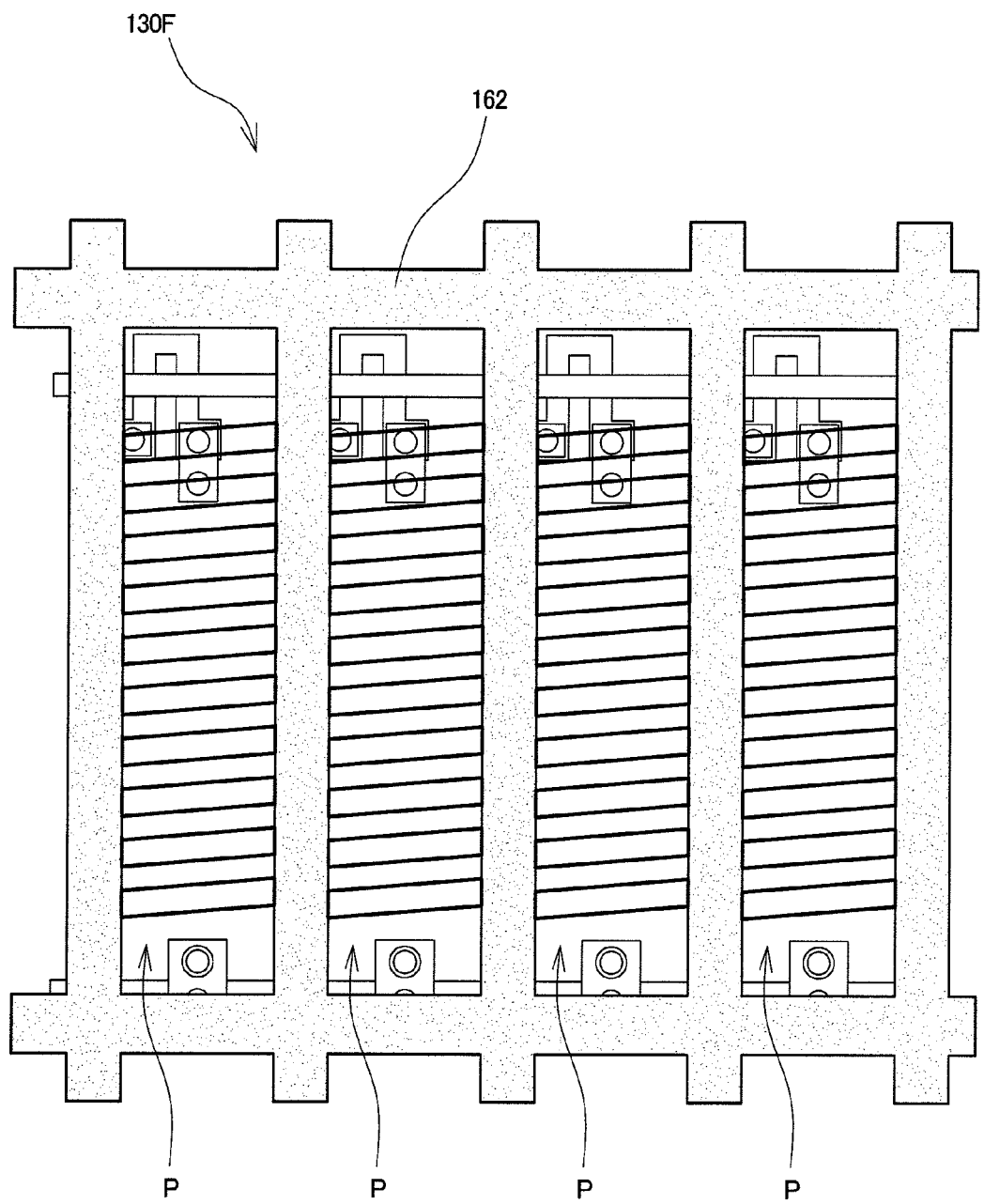

Referring now to FIGS. 7 to 10, the structure layout of the display region corresponding to four pixels of the liquid crystal panel 30F viewed from front will be described. For clarification of the drawings, FIG. 7 shows a structure in which the pixel electrode 52 shown in FIG. 8 is removed, FIG. 8 shows a structure in which the common electrode 60 shown in FIG. 9 is removed, and FIG. 9 shows a structure in which the black matrix 62 shown in FIG. 10 is removed. In FIGS. 7 to 10, the substrate 34 or the like is omitted. Further, in FIG. 8 and other drawings, the pixel electrode 52 is shown by a bold dashed and dotted line, in FIG. 9 and other drawings, the common electrode 60 is shown by a bold solid line, and in FIG. 10, the black matrix 62 is blacked out, these features are highlighted only for the purpose of clarification of the drawings.

In the liquid crystal panel 30F, similar to the liquid crystal panel 30T described above, the pixel disposing region 46B in which two pixel TFTs 70 are disposed and the pixel disposing region 46B in which no pixel TFTs 70 are disposed are arranged alternately. The pixel electrode 52 connected to one pixel TFT (on the left side in the shown example), as a whole, is provided within the pixel disposing region 46B in which the two pixel TFTs 70 are disposed. On the other hand, the pixel electrode 52 connected to the other pixel TFT (on the right side in the shown example) extends across the drain line 46 to which the other pixel TFT is connected so that this pixel electrode 52 is provided over the two adjacent pixel disposing regions 46B.

In the example shown in FIGS. 7 to 10, the semiconductor layers 36 for the pixels P1 and P2 each having a substantially U shape are provided in opposite directions (in the drawing, the substantially U of the semiconductor layer 36 for the pixel P1 shape is shown opening towards the bottom of the drawing). In this case, the source and the drain of the pixel TFT 70 for the pixel P1 are provided on one side with respect to the gate line 40, and the source and the drain of the pixel TFT 70 for the pixel P2 are provided on the other side with respect to the gate line 40. Here, such an arrangement for the pixel TFTs 70 can be applied to the liquid crystal panel 32T described above. To the contrary, the arrangement of the pixel TFTs 70 which is illustrated above with regard to the liquid crystal panel 32T (see FIGS. 3 and 4) can be applied to the liquid crystal panel 32F.

The common electrode 60 is provided in each pixel disposing region 46B so as to overlap the pixel electrode 52. In the illustrated example, the common electrode 60 is provided in each pixel disposing region 46B. In each of the pixels P1 and P2, a storage capacitor is formed by including the pixel electrode 52 and the common electrode 60 which is opposed to the pixel electrode 52 with the FFS insulating film 58 being interposed therebetween. Here, the common electrode 60 may be provided in common to a plurality of adjacent pixels P1 and P2, and also for all the pixels P1 and P2. In this case, the common electrode line 54 and the intermediate electrode for common electrode 56 need not be provided for each pixel P1 or P2.

The black matrix 62 can be provided in a manner similar to the case of the liquid crystal panel 30T described above. In the illustrated example, the black matrix 62 does not overlap the two pixel TFTs 70 provided within the pixel disposing region 46B, and the two openings 62P I and 62P2 have an identical shape and an identical size.

With regard to the liquid crystal panel 30F, when the pixel TFT 70 is referred to a pixel element portion the pixel element portion for the pixel P2 is provided, along with the pixel element portion for the pixel P1, in the pixel disposing region 46B in which the pixel P1 is disposed. Consequently, as with the liquid crystal panel 30T described above, it is possible to achieve chromaticity adjustment or the like without reducing the overall brightness of the liquid crystal panel as a whole. Alternatively, it is possible to increase the brightness of the liquid crystal panel as a whole compared to that achieved by the chromaticity adjustment method of related art.

While in the above examples, the pixel element portion includes the pixel TFT 70 or includes the pixel TFT 70 and the storage capacitor 72, when any other element is also provided in the pixel, such an element can also be included in the pixel element portion relocated to the adjacent pixel disposing region 46B.

Further, while in the examples described above, the pixel TFT 70 has a structure corresponding to a case wherein two gate electrodes are provided between the source and the drain of the semiconductor layer 36, a general TFT having a structure in which the gate line 42 intersects the semiconductor layer 36 once between the source and the drain may also be used as the pixel TFT 70. Also, other switching elements, including a MIM (Metal Insulator Metal), may be used in place of the pixel TFT 70. Here, the array substrate in which a TFT is used as a switching element as described above is also referred to as a TFT substrate.

Moreover, while in the above examples, the liquid crystal panels 30T and 30F perform color display using four colors of red (R), green (G), blue (B), and cyan (C), the colors are not limited to these examples and the number of display colors is not limited to four.

Further, when one pixel is formed by four colored regions, the four colored regions can be formed by a colored region of a blue type hue, a colored region of a red type hue, and a colored region of two types of hues selected among hues ranging from blue to yellow, in the visible light region (380 to 780 nm) in which the hue changes in accordance with the wavelength. Here, the term "type" is used such that, when it is referred to as a "blue type" hue, it is not limited to a hue of purely blue color, and includes all bluish colors, such as blue purple, blue green, and the like. Similarly, a red type hue is not limited to purely red, and can include orange or the like. Further, each colored region may be formed by a single colored layer (color filter) or by a plurality of colored layers of different colors that are layered. Also, although the color region has been described with regard to hue, the hue can be used to determine a color by changing the color saturation and lightness as required.

With regard to the specific range of hue, the colored region of blue type hue corresponds to a hue range from blue purple to blue green, and more preferably from indigo to blue. The colored region of red type hue corresponds to a hue range between orange and red. The colored region of one hue selected from blue to yellow is in a range between blue and green, and more preferably from blue green to green. The colored region of the other hue selected from blue to yellow is in a range between green to orange, and more preferably from green to yellow, or from green to yellow green.

Here, the same hue is not used for each colored region. For example, when green type hue is used for one of the colored regions of hues selected from a range from blue to yellow, blue type or yellow green type hue is used for the other colored region.

Consequently, color reproductivity over a wider range than possible with typical RGB can be achieved.

While in the above example color reproductivity of a wide range has been described with regard to hue, an example in which color reproductivity is represented by the wavelength transmitting the colored region will be described.

In this example, a blue type colored region is a colored region in which the peak of the wavelength falls in the range of 415 to 500 nm, preferably of 435 to 485 nm. A red type colored region is a colored region in which the peak of the wavelength is 600 nm or higher, preferably 605 nm or higher. One of the color regions of hue selected from hues from blue to yellow is a colored region in which the peak of the wavelength falls in the range of 485 to 535 nm, preferably of 495 to 520 nm, and the other color region is a colored region in which the peak of the wavelength falls in the range of 500 to 590 nm, preferably of 530 to 565 nm.

Further, the color reproductivity will also be represented by a x-y chromaticity diagram. In this example, the blue type colored region is a colored region in which $x \leq 0.151$ and $y \leq 0.056$, preferably $0.134 \leq x \leq 0.151$ and $0.034 \leq y \leq 0.056$. A red type colored region is a colored region in which $0.643 \leq x$ and $y \leq 0.333$, preferably $0.643 \leq x \leq 0.690$ and $0.299 \leq y \leq 0.333$. One of the color regions of hue selected from hues from blue to yellow is a colored region in which $x \leq 0.164$ and $0.453 \leq y$, preferably $0.098 < x < 0.164$ and $0.453 \leq y \leq 0.759$, and the other color regions is a colored region in which $0.257 \leq x$ and $0.606 \leq y$, preferably $0.257 \leq x \leq 0.357$ and $0.606 \leq y \leq 0.670$.

The light source for each of the RGB colors, such as an LED (Light Emitting Diode), a fluorescent tube, or organic EL (Electro Luminescence), may be used as a backlight unit for emitting backlight onto the liquid crystal panel 30T, 30F. Alternatively, a white light source may also be used. Here, a white light source formed by a light emitting unit of blue color and a YAG phosphor (yttrium-aluminum-garnet phosphor) may be used.

With regard to the RGB light source, a light source in which the peak of the wavelength is in the range of 435 nm to 485 nm is preferable for blue (B), a light source in which the peak of the wavelength is in the range of 520 nm to 545 nm is preferable for green (G), and a light source in which the peak of the wavelength is in the range of 610 nm to 650 nm is preferable for red (R).

By appropriately selecting a color filter in accordance with the wavelength of the RGB light source, color reproductivity of a wider range can be obtained.

Alternatively, a light source in which the wavelength has a plurality of peaks, 450 nm and 565 nm, for example, may also be used.

Example structures of the above-described four colored regions include colored regions of red, blue, green, and cyan (blue green) hues; colored regions of red, blue, green, and yellow hues; colored regions of red, blue, deep green, and yellow hues; colored regions of red, blue, emerald, and yellow hues; colored regions of red, blue, deep green, and yellow green hues; or colored regions of red, blue green, deep green, and yellow green hues.

It will be obvious to those having skill in the art that many changes may be made in the above-described details of the preferred embodiments of the invention The scope of the invention, therefore, should be determined by the following claims.

What is claimed is:

1. A liquid crystal panel comprising,
   a drain line extending between a first pixel and a second pixel which are adjacent to each other;
   a gate line extending in a direction intersecting with the drain line;
   a first transistor for the first pixel, the first transistor being provided on a side with respect to the drain line where the first pixel is disposed, the first transistor having a semiconductor layer intersecting with the gate line twice; and
   a second transistor for the second pixel, the second transistor being provided, along with the first transistor, on the side with respect to the drain line where the first pixel is disposed, the second transistor having a semiconductor layer intersecting with the gate line twice,
   wherein a source and a drain of the first transistor are provided on one side with respect to the gate line, and a source and a drain of the second transistor are provided on the other side with respect to the gate line.

2. The liquid crystal panel according to claim 1, further comprising:
   a first pixel electrode for the first pixel; and
   a second pixel electrode for the second pixel,
   wherein the first pixel electrode and the second pixel electrode are connected with the first transistor and the second transistor, respectively, on the side with respect to the drain line where the first pixel is disposed.

3. The liquid crystal panel according to claim 1, wherein a storage capacitor for the first pixel is formed by including a first pixel electrode and a first common electrode which is provided opposite to the first pixel electrode with an insulating film being interposed therebetween, and a storage capacitor for the second pixel is formed by including a second pixel electrode and a second common electrode which is provided opposite to the second pixel electrode with an insulating film being interposed therebetween.

4. The liquid crystal panel according to claim 1, wherein the second transistor for the second pixel is connected with the drain line, and the first transistor for the first pixel is connected with a drain line other than the drain line with which the second transistor is connected.

5. The liquid crystal panel according to claim 1, wherein the first pixel is a pixel for displaying a color including a wavelength at which a spectrum intensity is higher than that of the second pixel.

6. The liquid crystal panel according to claim 5, wherein the color including the wavelength at which a spectrum intensity is higher than that of the second pixel is cyan or green.

* * * * *